US009235855B2

(12) United States Patent
Smith et al.

(10) Patent No.: US 9,235,855 B2
(45) Date of Patent: Jan. 12, 2016

(54) DELIVERY OF SECURITY SOLUTIONS BASED ON-DEMAND

(71) Applicants: Jeffrey O. Smith, Dallas, TX (US); Michael Marett, Atlanta, GA (US)

(72) Inventors: Jeffrey O. Smith, Dallas, TX (US); Michael Marett, Atlanta, GA (US)

(73) Assignee: Numerex Corp., Atlanta, GA (US)

( * ) Notice: Subject to any disclaimer, the term of this patent is extended or adjusted under 35 U.S.C. 154(b) by 159 days.

(21) Appl. No.: 14/075,467

(22) Filed: Nov. 8, 2013

(65) Prior Publication Data

US 2014/0136379 A1 May 15, 2014

Related U.S. Application Data

(60) Provisional application No. 61/725,181, filed on Nov. 12, 2012.

(51) Int. Cl.
*G07F 19/00* (2006.01)
*H04M 15/00* (2006.01)
*H04M 11/04* (2006.01)
*H04M 11/00* (2006.01)
(Continued)

(52) U.S. Cl.
CPC .............. *G06Q 30/04* (2013.01); *G08B 29/00* (2013.01); *B60R 25/10* (2013.01); *B60R 25/1004* (2013.01); *G08B 13/00* (2013.01); *G08B 25/005* (2013.01); *G08B 29/16* (2013.01)

(58) Field of Classification Search
CPC ...... G08B 21/08; G08B 29/16; G08B 25/005; G08B 29/00–29/24; G08B 13/00; G08B 13/08; G08B 1/00; B60R 25/1004; B60R 25/10; B60R 25/1003

USPC .............. 455/404.1, 404.2, 414.1, 412.2, 455/405–410, 466; 340/540, 531, 500–506, 340/426.16, 517, 539.22
See application file for complete search history.

(56) References Cited

U.S. PATENT DOCUMENTS 6,314,572 B1 * 11/2001 LaRocca ............ G06Q 30/0207
348/E7.071
6,529,723 B1 * 3/2003 Bentley ............... B60R 25/1004
340/573.1

(Continued)

FOREIGN PATENT DOCUMENTS

EP 1936560 A1 6/2008

OTHER PUBLICATIONS

International Search Report for PCT/US2013/069662, issued Feb. 21, 2014.

*Primary Examiner* — Olusegun Goyea
(74) *Attorney, Agent, or Firm* — King & Spalding LLP

(57) ABSTRACT

A computer can receive an alarm event data that results from detection of an event by an alarm system. The alarm event data comprises an identifier for the alarm system. In response to receiving the alarm event data, the computer can access a service subscription account associated with security services for the alarm system. Based on information maintained in the service subscription account, the computer can determine whether a processing service fee is associated with an action of forwarding the alarm event data to a central monitoring station or a mobile computing device associated with the service subscription account. If a processing service fee is associated with the forwarding action, the computer can record the alarm event data and the processing service fee in a record to support a creation of an invoice and forward the alarm event data to the central monitoring station or the mobile computing device.

20 Claims, 12 Drawing Sheets

(51) Int. Cl.
  *G08B 23/00*   (2006.01)
  *G08B 26/00*   (2006.01)
  *G06Q 30/04*   (2012.01)
  *G08B 29/00*   (2006.01)
  *B60R 25/10*   (2013.01)
  *G08B 13/00*   (2006.01)
  *G08B 25/00*   (2006.01)
  *G08B 29/16*   (2006.01)

(56) References Cited

U.S. PATENT DOCUMENTS

| | | | | |
|---|---|---|---|---|
| 6,591,094 B1* | 7/2003 | Bentley | ............... | B60R 25/1004 455/405 |
| 8,265,605 B2* | 9/2012 | Marett | ............... | G06Q 30/0224 340/500 |
| 8,456,293 B1* | 6/2013 | Trundle | ............ | G08B 21/0423 340/517 |
| 8,618,927 B2* | 12/2013 | Wohlert | ................ | H04M 11/04 340/531 |
| 2002/0177428 A1* | 11/2002 | Menard | .................. | G08B 29/24 455/404.1 |
| 2003/0071724 A1 | 4/2003 | D'Amico | | |
| 2005/0154598 A1 | 7/2005 | Kanayama et al. | | |
| 2005/0197106 A1* | 9/2005 | Bristow | .............. | B60R 25/1003 455/412.2 |
| 2006/0244589 A1* | 11/2006 | Schranz | ................. | G06Q 40/08 340/539.22 |
| 2008/0042809 A1* | 2/2008 | Watts | .................. | B60R 25/1003 340/426.16 |
| 2009/0181640 A1* | 7/2009 | Jones | ................... | G08B 13/196 455/404.2 |
| 2009/0295571 A1* | 12/2009 | Hosey | ................... | G08B 29/16 340/540 |
| 2010/0274366 A1* | 10/2010 | Fata | ...................... | G05B 15/02 700/7 |
| 2012/0157034 A1* | 6/2012 | Martin | ................... | G08B 25/08 455/404.1 |

\* cited by examiner

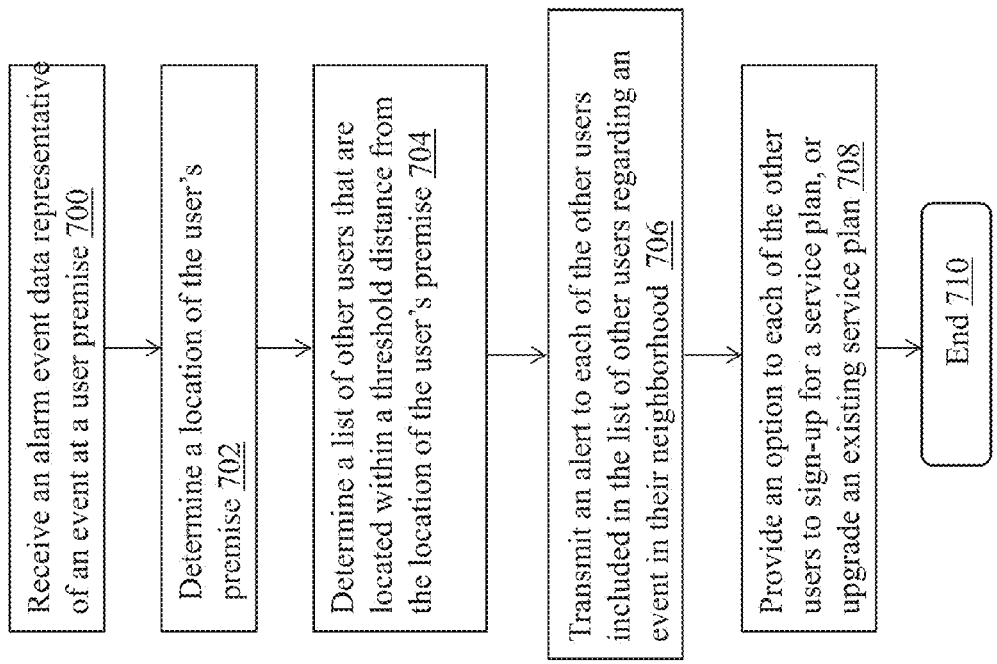

DELIVERY OF SECURITY SOLUTIONS BASED ON-DEMAND

CROSS-REFERENCE TO RELATED APPLICATIONS

This application claims priority to U.S. Provisional Patent Application No. 61/725,181, filed Nov. 12, 2012 in the names of Jeffery O. Smith and Michael Marett and entitled "On-Demand Security," the entire contents of which are hereby incorporated herein by reference. This application is also related to U.S. patent application Ser. No. 13/971,935, filed Aug. 21, 2013 in the name of Michael A. Marett and Edward I. Comer and entitled "Service Escrowed Transportable Wireless Event Reporting System," the entire contents of which are hereby incorporated herein by reference.

FIELD OF INVENTION

The present invention relates generally to the field of security systems, and, more particularly, to a provision of security solutions on an "on-demand" event basis.

BACKGROUND

Businesses and individuals may use security alarm systems to detect undesirable events. The security alarm systems may utilize site-located equipment that detect an undesirable event, such as fire or unauthorized intrusions, and report such events via a communication channel to either a centralized monitoring center or directly to a user, such as a subscriber.

With conventional security alarm systems, the user is charged a predetermined recurring monitoring fee, such as a monthly recurring fee, that accommodates a certain number of event reports, often an unlimited quantity based on the fee. The requirement to make a recurring fee payment ay deter potential users from installing or using an actively monitored security system for a residence and/or business because a recurring fee-based monitoring system may represent an expense that is not warranted for the users security requirements. For example, an individual living in a safe neighborhood may only have a limited number of reportable events (e.g., one or two reports in a year) and paying the monthly recurring fee may not be cost effective for the individual. Thus, there exists a need for delivery of security solutions in a way that is more affordable to a larger customer base and customized for a market segment that has a limited or minimal set of annual reportable events.

SUMMARY

For the inventive concept of an "on-demand" security service, a subscriber incurs a processing service fee for processing an alarm event and/or forwarding data associated with the alarm event to a central monitoring station or to a mobile computer device associated with the subscriber. In contrast to conventional security systems, an on-demand service subscriber does not incur a periodic or recurring fee for monitoring activities conducted by the alarm system or the central monitoring system. The recurring monitoring fee is eliminated or reduced in favor of a per-event fee charged for reporting actual events. Accordingly, this "on-demand" approach to security services can eliminate or reduce the conventional recurring monitoring fee for a market segment having a security profile that is defined by a limited or minimal set of annual reportable alarm events.

Under one payment model, the security service subscriber is required to make a fee payment only if an alarm event is detected for forwarding to a central monitoring station or the subscriber. The requirement for a fee payment for security services is triggered by the occurrence of an actual alarm event. This is a per event fee model rather than a recurring monitoring service fee model. For an alternative payment model, the subscriber can pay a reduced periodic monitoring fee and a smaller per event fee to strike a balance between monitoring and event fees. In yet another payment model, the security service subscriber can pay a one-time annual membership fee that would entitle the subscriber to the on-demand service. In one embodiment, the one-time annual membership fee may cover an overhead cost of operating, maintaining, and/or keeping the alarm system and communication networks available for processing alarm events. In addition, the annual membership fee can cover at least one delivery of alarm event to a central monitoring station and/or the subscriber. One of ordinary skill in the art can understand and appreciate that the services offered or covered by the annual membership fee as discussed above is exemplary, and the annual membership fee can cover any other types of services or combination of services.

A gateway server, also referred to herein as a service, can be positioned between alarm panels of various alarm systems and one or more monitoring stations. The server is configured to accept alarm event data from the alarm panels, validate the security service accounts associated with the alarm event data, and determine whether a per event fee should be charged for processing the event for forwarding to a monitoring station.

For one aspect of the invention, a computer, such as the above-described server, can receive an alarm event data that represents an alarm system's detection of an event at a premise monitored by the alarm system. The alarm event data typically comprises an identifier for the alarm system and event data. In response to receiving the alarm event data, the computer can access a service subscription account, also referred to herein as customer subscription account, associated with security services for the alarm system. Based on information maintained in the account, the computer can determine whether a processing service fee is associated with an action of forwarding the alarm event data to a central monitoring station or a mobile computing device associated with the service subscription account. If a processing service fee is associated with the forwarding action, the computer can record all or a portion of the alarm event data and the processing service fee in a record to support a creation of an invoice. The server also forwards the alarm event data to the central monitoring station or the mobile computing device to report the event.

BRIEF DESCRIPTION OF THE FIGURES

Example embodiments are illustrated by way of example and not limitation in the figures of the accompanying drawings, in which:

FIG. 7 is a flow chart that illustrates an example process of offering security services based on events in surroundings of a premise, according to certain exemplary embodiments of the present invention.

Figure 1:
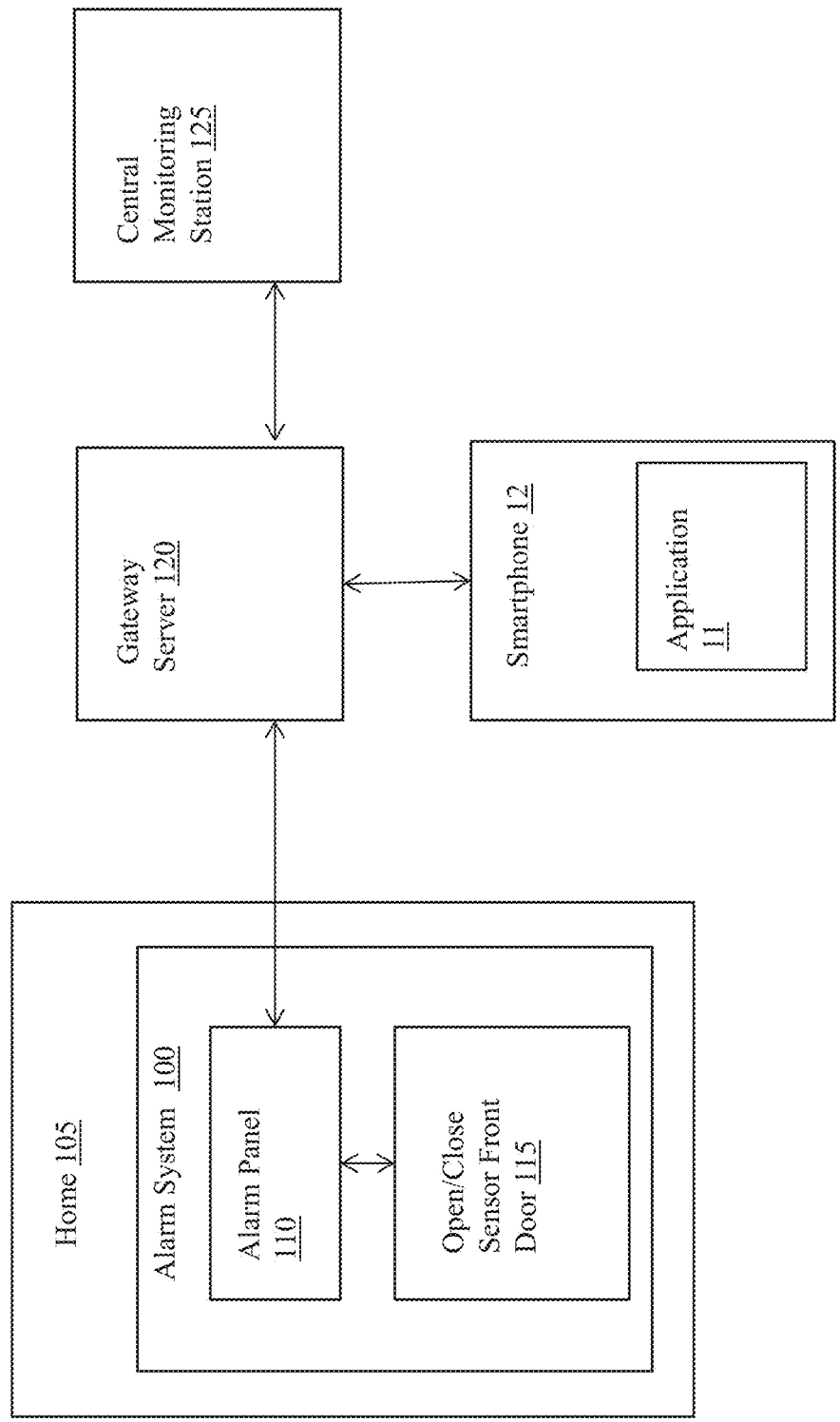
FIG. 1 illustrates a functional block diagram of a representative operating environment for an exemplary alarm system, according to certain exemplary embodiments of the present invention.

Aspects of the invention may be better understood with reference to the above drawings. The elements and features shown in the drawings are not to scale, emphasis instead being placed upon clearly illustrating the principles of exemplary embodiments of the present invention. Moreover, certain dimensions may be exaggerated to help visually convey such principles. In the drawings, reference numerals designate like or corresponding, but not necessarily identical, elements throughout the several views. Other features of the present embodiments will be apparent from the Detailed Description that follows.

DETAILED DESCRIPTION

A 'conventional' security service comprises a payment model that requires the subscriber to incur a recurring monthly monitoring fee for the security service. For a conventional service plan, the subscriber does not incur an additional service fee associated with processing and/or reporting each detected event. The recurring monitoring fee is incurred by the subscriber regardless of whether the alarm system detects and processes any events during a service interval. Indeed, the recurring monitoring fee typically does not vary for a service period involving one event or a service period involving multiple events. By way of example, the subscriber may pay a monthly recurring fee of $20 for an alarm system monitoring service for the user's premise, inclusive of any processing activities and reporting of any detected events to a central monitoring station or the subscriber.

In contrast, the inventive "on-demand" service is based on a per event fee model and may not include a recurring monitoring fee model. For an exemplary embodiment, a monthly recurring fee may be absent for monitoring services, but the subscriber incurs a service fee for processing and/or reporting each detected event. The subscriber incurs the event fee only if an actual event is detected by the alarm system and forwarded for action by the central monitoring station or the subscriber. For example, for each detected event, the user may pay a service fee or "per event" fee of $40 for processing and reporting each of the detected event to the central monitoring station or the subscriber.

A 'hybrid' service comprises a variation of the exemplary 'on-demand' service by combining the monthly recurring fee of the conventional monitoring service with a per event service fee for the detected occurrence of an event. The monthly recurring fee is typically set at a payment amount less than the monthly recurring fee for a conventional service and the per event fee is set at a payment amount less than a service fee incurred for the on-demand service. For example, in the hybrid service, the subscriber may pay a reduced monthly fee of $10 as compared to the $20 monthly recurring fee for the conventional monitoring service and a reduced service fee of $15 for processing and reporting each detected event (as compared to the service fee of $40 for the on-demand service), thereby striking a balance between usage and affordability for the customer.

One of ordinary skill in the art can understand and appreciate that the above-mentioned examples of security service solutions are not exhaustive, and many other services and fee payment options may be available to a user without departing from a broader scope of the following description.

Turning now to a brief review of the architecture for an exemplary alarm system, an alarm panel is typically installed at a customer's premise. The customer's premise can be a residence building, business building, or any other appropriate space that the customer desires to be monitored for undesirable activity or events. When an undesirable event occurs, the alarm system detects the event and generates an alarm event data. The alarm event data may be representative of the alarm event (e.g., undesirable event). The alarm event data may include an identifier that identifies the alarm system that generated the alarm event data, and data that describes the detected event and/or identifies the type of event that has been detected and/or identifies the monitored premise.

The generated alarm event data is transmitted by a communication engine of the alarm system to a gateway server. Upon receiving the alarm event data, the gateway server processes the alarm event data to determine customer subscription information of a user associated with the alarm system or the monitored premise. On the basis of the customer subscription information, the gateway server determines if a customer subscription account associated with the user is valid.

An exemplary aspect of the on-demand delivery of security solutions may include a process where the gateway server determines the type of service to which the alarm system is enrolled based on the customer subscription information. Upon determining that the alarm system is enrolled for an on-demand service, the gateway server determines that a service fee is associated with processing and forwarding the alarm event data to a central monitoring station and/or a computing device (e.g., mobile computing device) associated with the subscriber. Accordingly, the gateway server retrieves billing information associated with the customer subscription account and identifies a corresponding payment account. Once the payment account is identified, the gateway server determines if sufficient funds are available in the payment account to cover a service fee for processing the alarm event data. The exemplary aspect further includes a process where, upon positive determination that sufficient funds are available and the customer subscription account is valid, the gateway server records the service fee and all or a portion of the alarm event data to a database of the gateway server to support the generation of an invoice for the event-driven service rendered to the subscriber. The process of charging the service fee to the payment account, generating the invoice, and/or sending the invoice to the user may be performed either by the gateway server or a third party billing system.

Once the alarm event data and the service fee are recorded, the gateway server transmits the alarm event data to a central monitoring station, which, in turn, can dispatch appropriate emergency services to the premise where the undesirable event is detected. The gateway server also can transmit the alarm event data to a computing device (e.g., mobile computing device, smartphone, etc.) of the subscriber's choice for presentation to the subscriber.

Another exemplary aspect of on-demand delivery of security solutions includes a process where the gateway server can offer the user a one-time reduced service fee for processing and forwarding an alarm event data provided the user registers for a service where the user has to pay a monthly recurring monitoring fee, such as a conventional security service (herein 'conventional' service) or a hybrid security service (herein 'hybrid service').

In an additional aspect, the gateway server reports detection of undesirable events within a pre-determined distance from the user's premise, for example breaks-in in the neighborhood in which the user's house is located. Further, the gateway server may offer options to enroll for complementary services, such as security services that may be relevant to the reported undesirable events.

Exemplary implementations for delivering security solutions based an "on-demand" solution will now be described in greater detail with reference to FIGS. 1-7, which describe representative embodiments of the present invention. First, FIGS. 1 and 2 will be discussed in the context of describing a representative operating environment associated with the delivery of security solutions based on-demand according to certain exemplary embodiments of the present invention. Further, the remaining FIGS. 3-7 will be discussed, making exemplary reference back to FIGS. 1-2 as may be appropriate or helpful.

The following paragraphs describe various embodiments for delivering security solutions based on-demand. It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

Further, the present invention may be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "exemplary embodiments" given herein are intended to be non-limiting and among others supported by representations of the present invention.

Moving now to discuss FIGS. 1-3 further, an exemplary embodiment of the present invention will be described in detail. As further discussed below and in accordance with certain embodiments of the present invention, FIGS. 1 and 2 illustrate an exemplary operational system for delivery of security solutions on-demand, and FIG. 3 describes processing tasks involved in delivery of security solutions in association with a conventional service.

FIG. 1 illustrates a functional block diagram of a representative operating environment for an exemplary alarm system, according to certain exemplary embodiments of the present invention. In particular, the operating environment 10 of FIG. 1 illustrates an exemplary alarm system 100 that monitors premises, in this case, a home 105, a gateway server 120, a central monitoring station 125, and a smartphone 12. In an example embodiment, an alarm panel 110 of the alarm system 100 receives signal inputs from sensors that detect events or conditions that may warrant issuance of an alarm. Although the sensors are represented in FIG. 1 by an open/close sensor for a front door of the home 105, those of skill in the art will understand that the sensors can comprise a variety of conventional sensors, including wired or wireless magnetic window and door sensors (e.g. the front door sensor 115 illustrated in FIG. 1), glass-break sensors, infra-red sensors, motion sensors, smoke detectors, and carbon monoxide sensors, etc. The alarm panel 110 can communicate wirelessly with an off-premises gateway server 120 that functions as an alarm gateway for multiple other alarm systems at other premises (not illustrated) and provides connectivity to a central monitoring station 125. The central monitoring station 125 can monitor the alarm systems and is typically staffed with people who can dispatch emergency services, such as police and fire responders, on an as-needed basis. The gateway server 120 also can communicate wirelessly with a user's smartphone 12 that runs a software program, typically implemented in the form of the application 11, to provide a remote user interface to certain alarm system features. The application 11 may be client side embodiment of the gateway server 120 which may be downloaded on-demand or pushed to the smartphone 12 by the gateway server 120.

Figure 2:
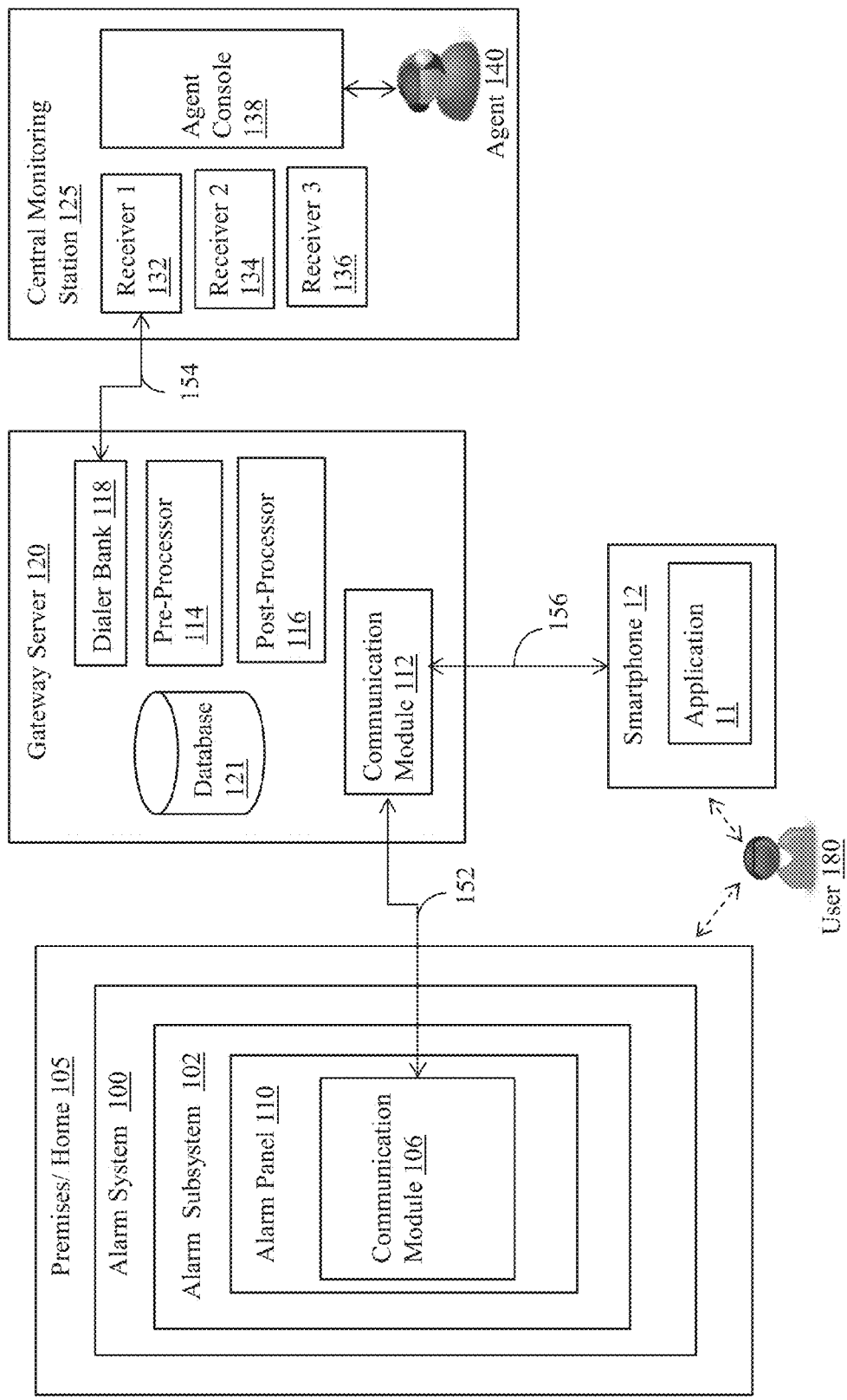
FIG. 2 illustrates the representative operating environment and the exemplary alarm system in greater detail, according to certain exemplary embodiments of the present invention.

Turning to FIG. 2, this figure illustrates the representative operating environment and the exemplary alarm system in greater detail, according to certain exemplary embodiments of the present invention. The exemplary alarm system 100 can include a communication module 106 that is deployed in the alarm panel 110 of the alarm system 100, the gateway server 120, a wireless communication link between the gateway server 120 and the communication module 106, and an application 11 that runs on a user's smartphone 12.

As shown in FIG. 2, an exemplary operating environment 10 includes the alarm system 100, the gateway server 120 that functions as an alarm gateway, and the central monitoring station 125. The alarm system 100 can include an alarm subsystem 102, the alarm panel 104, and the communication module 106. The alarm subsystem 102 includes one or more sensors for detecting various types of alarm events, such as fire, burglary, or medical emergency. The sensors typically comprise wired or wireless magnetic window and door sensors (e.g. the front door sensor 115 illustrated in FIG. 1), glass-break sensors, infra-red sensors, motion sensors, smoke detectors, and carbon monoxide sensors. The alarm subsystem 102 may further include one or more sirens, speakers, and microphones for sounding an alarm, capturing sounds within the home/premises 105, and amplifying a voice of an agent 140. The alarm panel 104 typically includes a display providing a current status of the alarm system 100 and a keypad including buttons and/or other controls to configure and interface with the alarm system 100. A user 180 of the alarm system 100 can determine a current status of the alarm system 100 by viewing the display of the alarm panel 104, and may arm and disarm the system through the panel 104.

The wireless communication module 106 provides a wireless transceiver with circuitry and associated firmware for establishing data and voice channels. Particularly, the communication module 106 is typically configured to establish a wireless data with the gateway server 120 via a cellular wireless communication path 152. In operation, the alarm system 100 can detect an alarm event using one or more of the sensors and communicate associated alarm event data to the gateway server 120 using a wireless data channel. For an alternative embodiment, the communications module can establish wireless data and voice communications channels with the gateway server 120 with the cellular wireless communications path 152.

An exemplary embodiment of the gateway server 120 can include a communication module 112, a pre-processor 114, a post-processor 116, a dialer bank 118, and a database 121. The communication module 112 of the gateway server 120 establishes data and voice channels with the communication module 106 of the alarm panel 104 via the cellular communication link 152. The communication module 112 further provides wireless communication with the user's smartphone 12 through the communication channel 156. The pre-processor 114 performs overhead functions of outbound network communications such as encoding, decoding, and packetizing data. The post-processor 116 receives, decodes, and processes data received by the communication module 112 (e.g., alarm event data) and controls operations of the gateway server 120. The dialer bank 118 can establish a voice channel call to the central monitoring station 125 via the communications link 154, which may utilize one or more wired or wireless communications links including the PSTN. The dialer bank 118 can further communicate data, including alarm event data received from the alarm system 100, to the central monitoring station 125 using DTMF signaling over the voice channel.

The database 121 can store computer-executable program code as well as data related to alarm systems, accounts of alarm monitoring subscribers (interchangeably referred to as 'user 180' herein) associated with the alarm system 100, alarm event data, and other associated data. For example, the database 121 may store data associated with alarm monitoring subscriber payment accounts for billing, subscriber authorization or validation and other purposes. The account data and other associated information stored in the database 121 can be maintained and updated via a network interface by account owners such as alarm services dealers. The alarm event data may be maintained and updated by the post-processor 116. Thus, the gateway server 120 provides and facilitates alarm monitoring services for multiple alarm systems at various homes and businesses in addition to the illustrated alarm system 100. As such, the database 121 typically stores subscriber-related data related to numerous alarm systems.

In operation, the gateway server 120 receives alarm event data representative of an alarm event from the alarm system 100, evaluates service parameters of the alarm system 100 and the alarm event data, and forwards the alarm event data along with associated information to the central monitoring station 125 if appropriate service parameters of the alarm system and the alarm event data are met.

The central monitoring station 125 includes at least one agent console 138 and multiple receiver modules 132, 134, and 136. In a typical operation, each agent 140 is able to view the agent console 138, which displays information associated with received alarm event data from alarm systems. After receiving alarm event data and associated information from the alarm system 100 and the gateway server 120, the agent console 138 may display details related to an alarm event occurring at the premises 105 where the alarm system 100 is installed. For example, based on alarm event data received from the alarm system 100, the agent console 138 may indicate that a fire, panic, burglary, or medical emergency is occurring where the alarm system 100 is installed. Additionally, the agent console 138 may display a street address or geographic coordinates of the home 105 and contact information for fire, police, and medical services. Based on the display, the agent 140 is able to assess the event where the alarm system 100 is installed. Thus, the central monitoring station 125 facilitates monitoring alarm systems installed at multiple locations by agents 140 who assess alarm events, and when deemed appropriate, may contact service personnel based upon alarm event data received from the alarm systems. For example, agents 140 monitoring the alarm system 100 at the central monitoring station 125 may call for fire, police, or medical service personnel to be dispatched to the premise 105.

Figure 3:
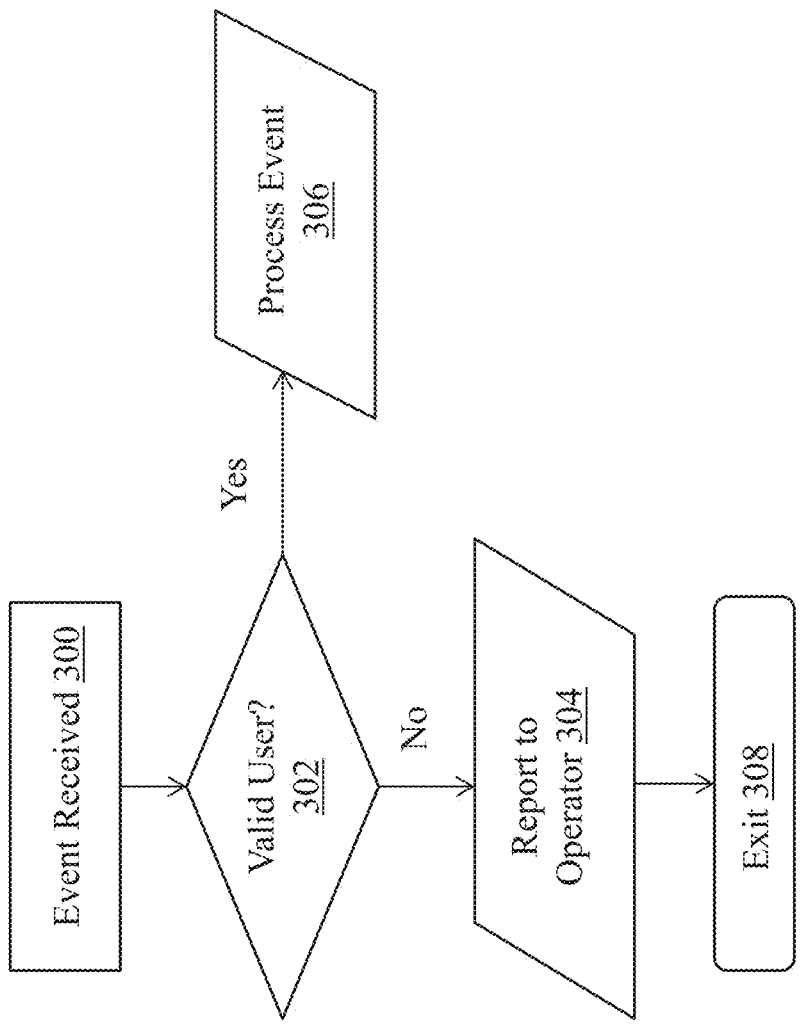
FIG. 3 is a flow chart that illustrates an overview of processing an alarm event data, according to certain exemplary embodiments of the present invention.

Turning to FIG. 3, this figure is a flow chart that that illustrates an overview of processing an alarm event data in associated with a conventional service, according to certain exemplary embodiments of the present invention. In operation 300, the gateway server 120 may receive an alarm event data from the alarm system 100. As described above, the alarm system 100 may generate the alarm event upon detecting an undesirable event at a premise 105 that is monitored by the alarm system 100. Upon receiving the alarm event data, the gateway server 120 may process the alarm event data to determine the identity of the alarm system that generated the alarm event data. The identity of the alarm system 100 may be determined based on an identifier included in the alarm event data. Further, based on the identifier, the gateway server 120 may retrieve customer information including a customer subscription account of the user 180 associated with the alarm system 100 and/or the premise 105 from the database 121.

Then, in operation 302, the gateway server 120 may determine if the customer subscription account of the user 180 is valid based on a comparison of the identifier to a subscriber information maintained in the database 121. The comparison activity may also identify service parameters and the types of security services to which the user 180 has subscribed, for example, two-way voice communication between a central station agent 140 and the secured premise 105. If the customer subscription account is not valid, then in operation 304, an operator of the gateway server 120 may be notified and the event reporting process may be aborted in operation 308.

However, if the customer subscription account is valid, in operation 306, the gateway server 120 may continue processing the alarm event data. Processing the alarm event data by the gateway server 120 may include forwarding the alarm event data to the central monitoring station 125, which in turn may dispatch an appropriate emergency service based on the type of event that has been reported. Once the undesirable event identified by the alarm event data is addressed by the central monitoring station 125, the event reporting process is terminated at operation 308. Further, a record of processing the alarm event data may be maintained by the gateway server 120 in the database 121. In some embodiments, the record may be communicated to a remote operator or controller (not shown) associated with the gateway server 120.

Turning now to FIGS. 4-7, these figures describe various exemplary aspects and/or embodiments of the on-demand delivery of security solutions. Although specific operations are disclosed in the flowcharts illustrated in FIGS. 4-7, such operations are exemplary. That is, embodiments of the present invention are well suited to performing various other operations or variations of the operations recited in the flowcharts. It is appreciated that the operations in the flowcharts illustrated in FIGS. 4-7 may be performed in an order different than presented, and that not all of the operations in the flowcharts may be performed.

All, or a portion of, the embodiments described by the flowcharts illustrated in FIGS. 4-7 can be implemented using computer-readable and computer-executable instructions which reside, for example, in computer-usable media of a computer system or like device. As described above, certain processes and operations of the present invention are realized, in one embodiment, as a series of instructions (e.g., software programs) that reside within computer readable memory of a computer system and are executed by the processor of the computer system. When executed, the instructions cause the computer system to implement the functionality of the present invention as described below.

Figure 4:
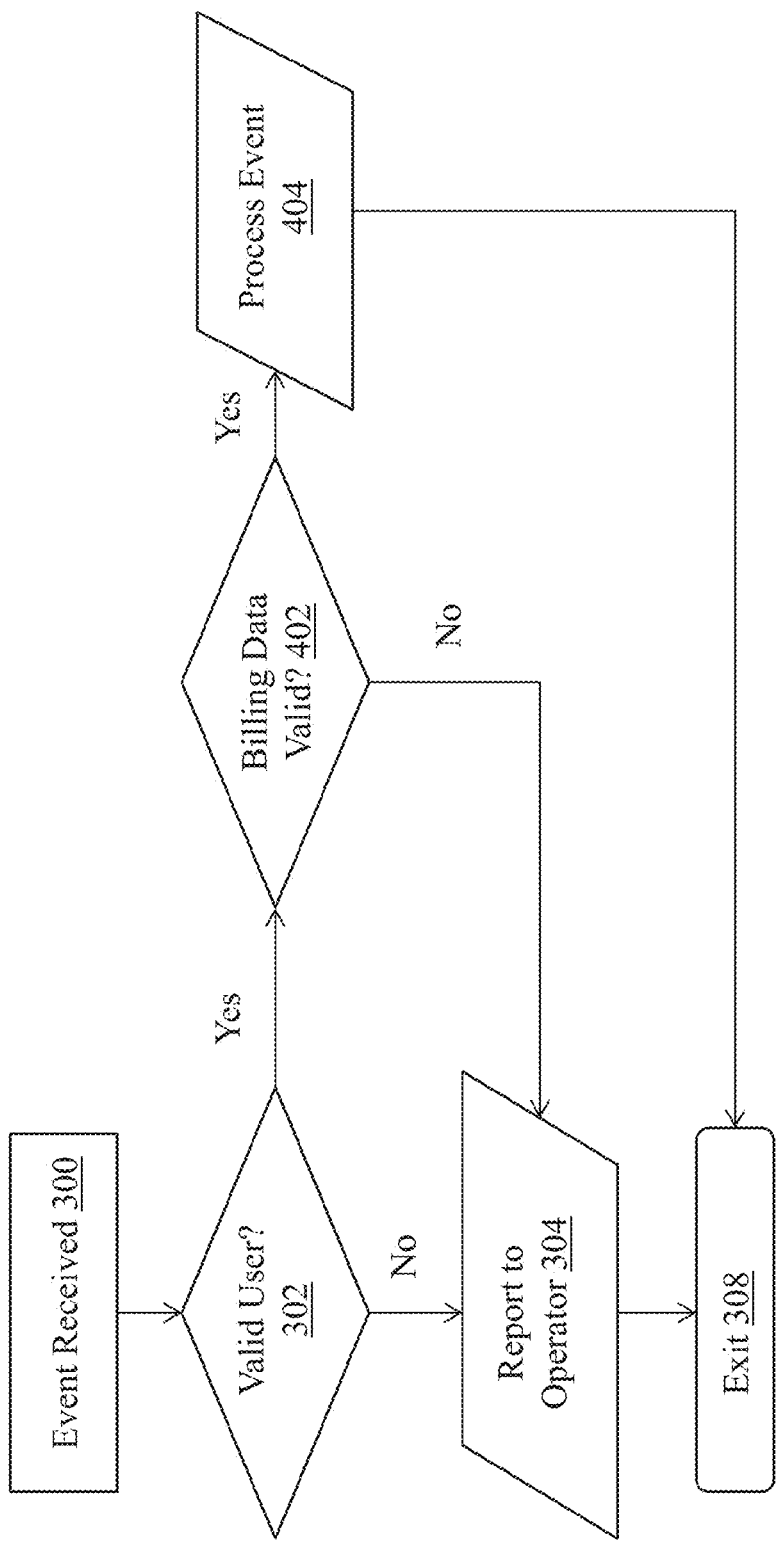
FIG. 4 is a flow chart that illustrates an example process associated with delivery of security solutions based on-demand, according to certain exemplary embodiments of the present invention.
Figure 5A:
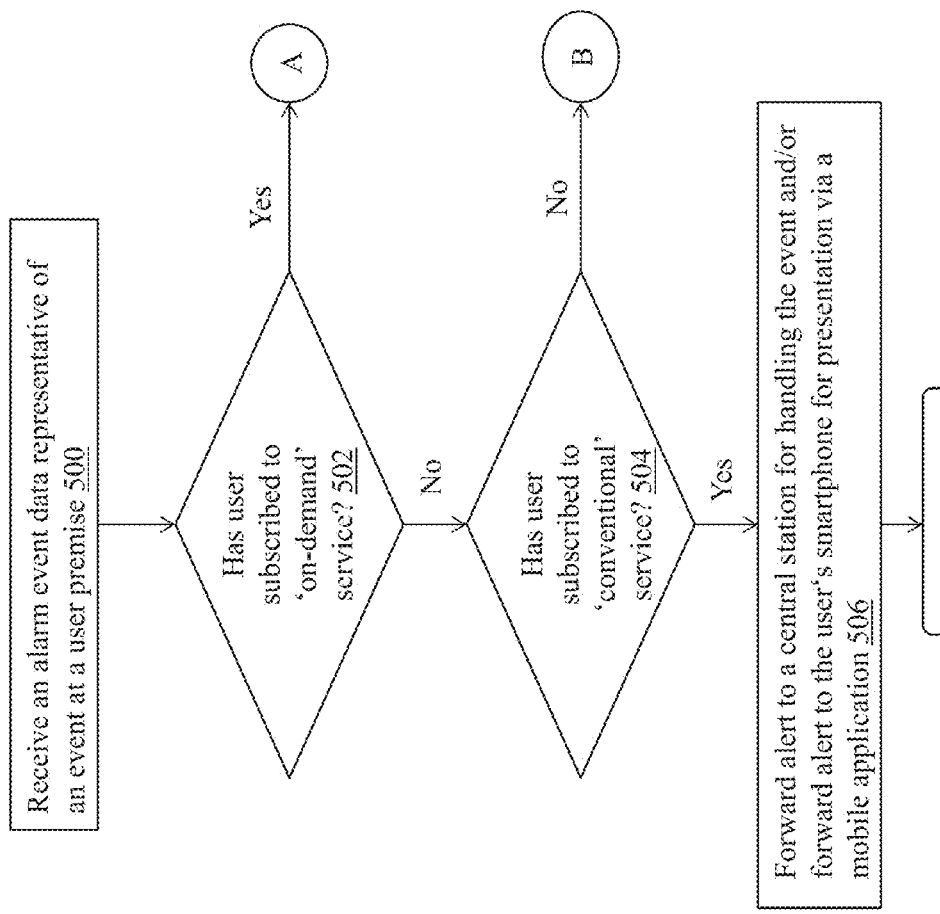
FIGS. 5A-5D (collectively 'FIG. 5')are flow charts that illustrate representative processing tasks of a gateway server in support of delivery of on-demand security solutions, according to certain exemplary embodiments of the present invention.
Figure 5B:
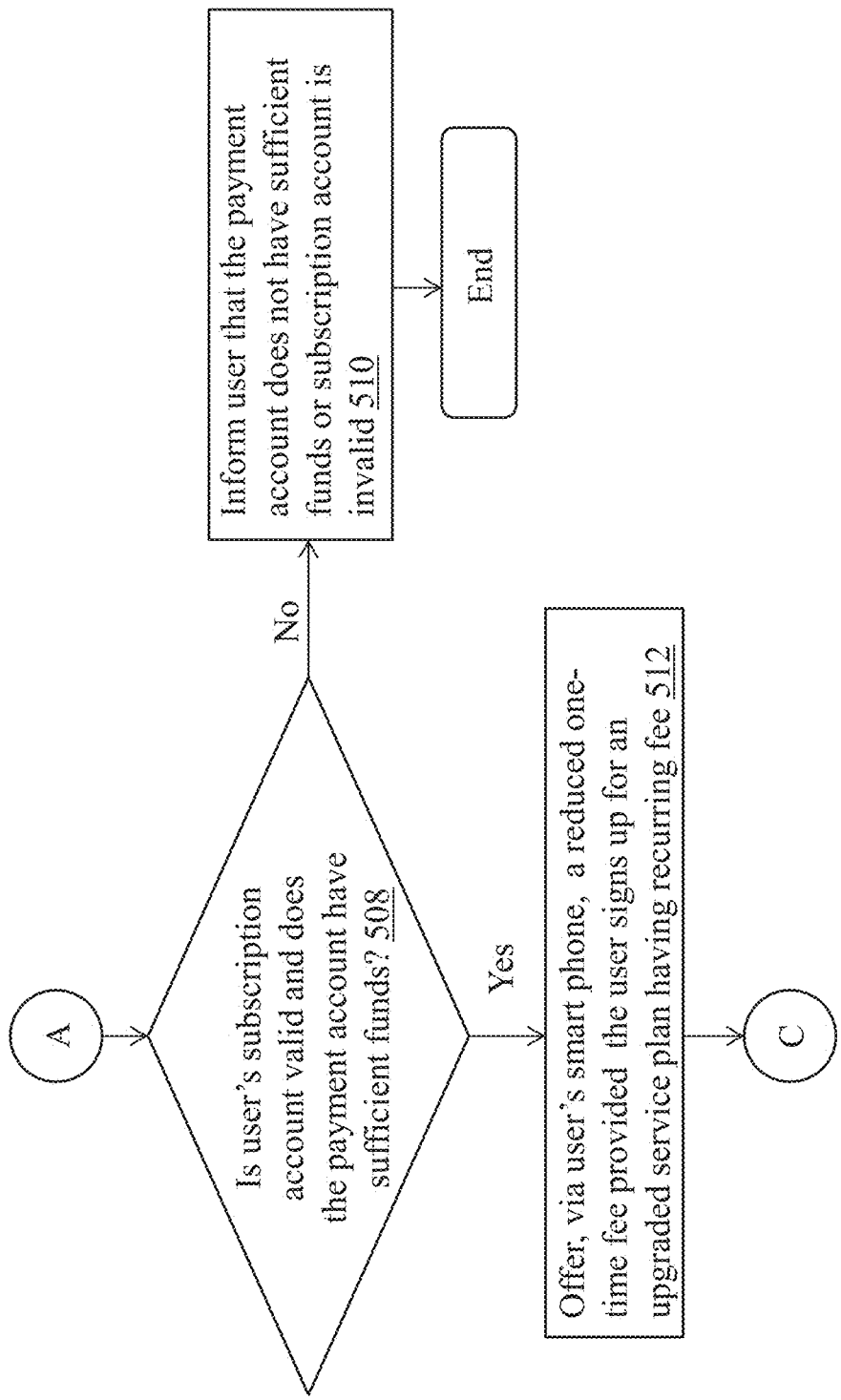
Figure 5C:
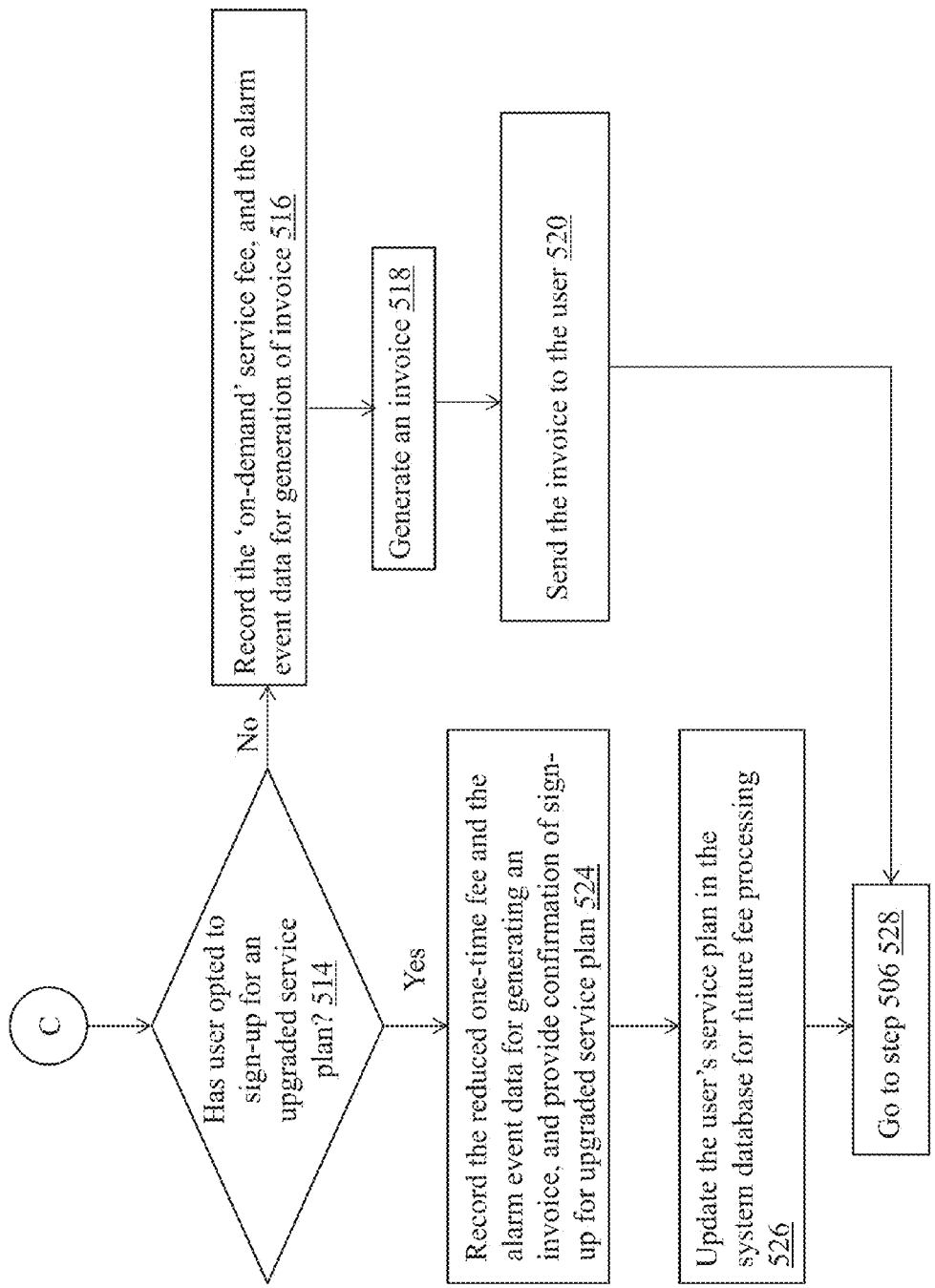
Figure 5D:
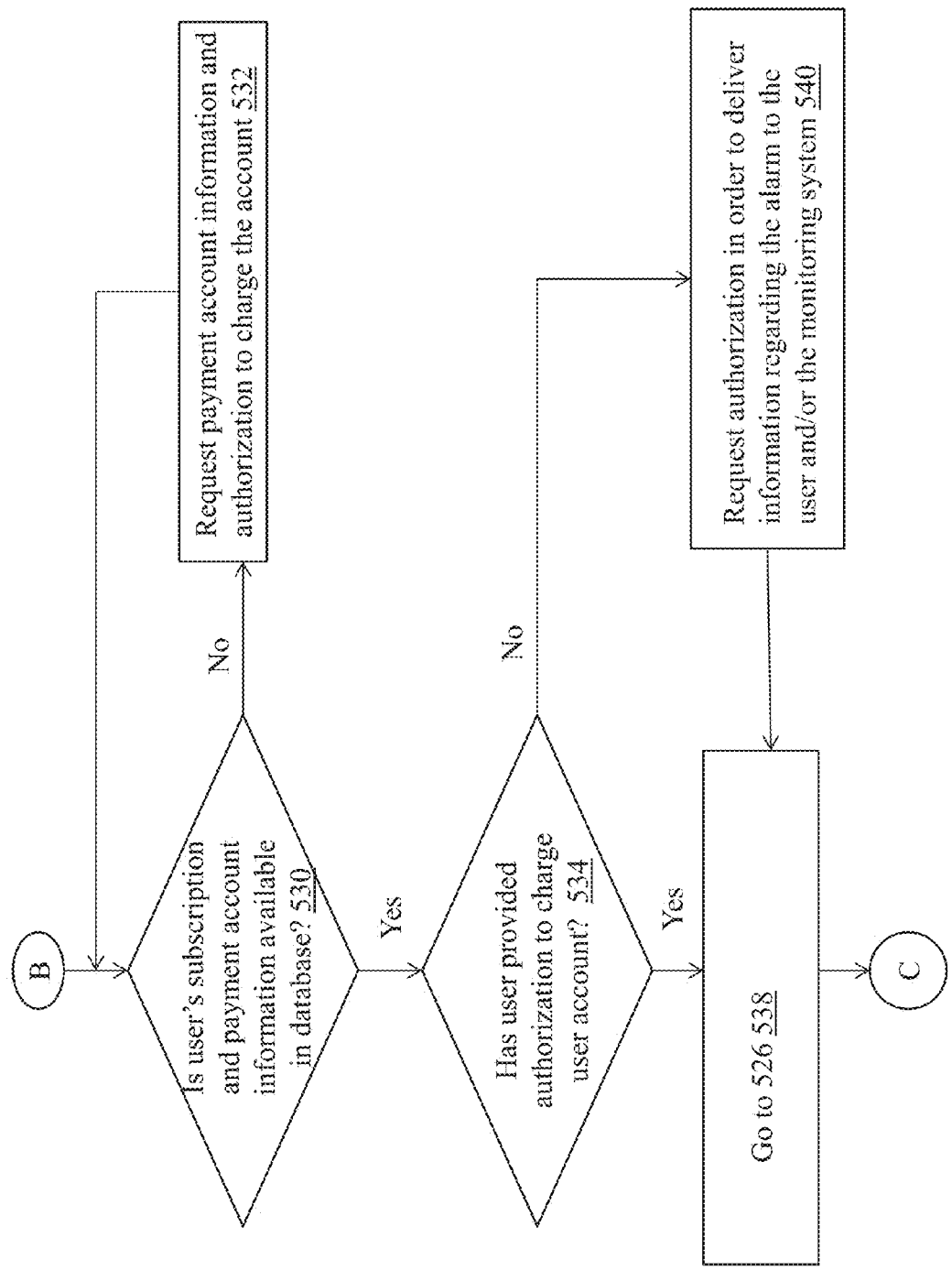

Turning now to FIG. 4, this figure is a flow chart that illustrates an example process associated with delivery of security solutions based on-demand, according to certain exemplary embodiments of the present invention. Operations 300, 304, and 308 are described above in association with FIG. 3, and will not be repeated for sake of brevity. In operation 302, the gateway server 120 processes the alarm event data to retrieve the identity of the alarm event system 100 based on the identifier included in the alarm event data. Further, the gateway server 120 may retrieve customer subscription account (herein 'subscription account') information of the user 180 associated with the alarm system 100 (e.g., subscriber).

Once the subscription account is retrieved, the gateway server 120 may determine if the subscription account is valid. If the subscription account is not valid, then in operation 304, the operator of the gateway server 120 is notified and the event reporting process is aborted in operation 308. Aborting the event reporting process may result in termination of alarm event data processing activity and the alarm event is not forwarded to the central monitoring station 125.

If the subscription account is valid, then, in operation 402, the gateway server 120 may retrieve the subscription parameters, such as the types of security services associated with the account and so on. In some embodiments, the determination of the service type may be made in parallel to the process of determining the account validity. On the basis of the subscription parameters, the gateway server 120 may determine that the alarm system is enrolled for an on-demand service and that a service fee is associated with processing and forwarding the alarm event data to a central monitoring station 125 or a mobile computing device (e.g., smartphone 12) of the user 180. Accordingly, the gateway server 120 may retrieve a billing information associated with the subscription account of the user 180 that includes a payment account of the user 180 towards which the service fee may be charged. In one example, validating the billing information may involve connecting to a credit card processor, which verifies that sufficient funds are available to cover a service fee associated with processing the alarm event data. If the billing information is invalid or sufficient funds are not available, then, in operation 304, the operator of the gateway server 120 is notified and the event reporting process is aborted in operation 308 as described above.

However, if the billing information is valid, then, in operation 404, the service fee for processing the alarm event data may be recorded for invoicing to the user 180 or submission to a billing system for issuance of an invoice. The gateway server 120 may record the event information in a local database 121 or a remote database. In another embodiment, the gateway server 120 may transmit the event information to a remote data collection center or processing center (e.g., billing system), in support of the generation of an invoice for the services incurred.

In contrast to conventional security alarm solutions where a user 180 is charged a monthly fee, in the on-demand service, the user 180 is charged a service fee for each event detected by the alarm system 100. The aforementioned service fee may include a fee to process the alarm event data, a fee for receiving the alarm event data, and/or a fee for forwarding all of or a portion of the alarm event data to the central monitoring station 125 and/or the user's smartphone 12. In one example embodiment, the service fee may also include fee to cover the cost involved in dispatching emergency services to the monitored premise 105 by the central monitoring station agent 140.

After validation of the subscription account and the billing information, the gateway server 120 may continue to process the alarm event data by forwarding the alarm event data or an alarm information to the central monitoring station 125 configured to report the event. Further, the central monitoring station 125 may be responsible for dispatching an appropriate emergency service. Once the undesirable event is addressed, the event processing may be terminated in operation 308.

As described above, in an on-demand service, a user 180 may not have monthly charges for the alarm monitoring service, but the user may be charged the aforementioned service fee per detected alarm event for communicating the alarm event data generated by the alarm system 100 to the central monitoring station 125 via the gateway server 120. In another example embodiment, the user 180 may be subscribed to a hybrid service and accordingly charged a monthly fee that is lesser than the monthly fee for conventional monitoring services in addition to a service fee that may or may not be lower than the service fee typically associated with the on-demand service.

Now turning to FIG. 5, this figure is a flow chart that illustrates representative processing tasks of a gateway server in support of delivery of on-demand security solutions, according to certain exemplary embodiments of the present invention.

In operation 500, the gateway server 120 receives an alarm event data from an alarm system 100 corresponding to the detection of an undesirable event at a monitored premise 105. As described above in association with FIGS. 3 and 4, upon receiving the alarm event data, the gateway server 120 may process the alarm event data to determine subscription information of a user 180 associated with the alarm system 100 and/or the monitored premise 105. Processing the alarm event data may include retrieving an identifier that identifies the alarm system 100 that generated the alarm event data. Further, based on the identity of the alarm system 100, the gateway server 120 may determine a user 180 (e.g., subscriber) associated with alarm system 100 and a subscription account associated with the user 180. Once the subscription account of the user 180 is determined, the gateway server 120 may determine subscription parameters associated with the subscription account of the user 180, such as the type of service to which the user 180 has subscribed, the billing information, the payment account details, and so on.

On the basis of the subscription parameters, in operation 502, the gateway server 120 may determine if the user 180 is subscribed to an on-demand service. If the user 180 is not subscribed to an on-demand' service, then in operation 504, the gateway server 120 may determine if the user 180 is subscribed to a 'conventional' service based on the subscription parameters. In operation 504, if the gateway server 120 determines that the user 180 is subscribed to a 'conventional' service, then, in operation 506, the gateway server 120 may forward the alarm event data to the central monitoring station 125, which in turn addresses the undesirable event at the monitored premise 105, provided the subscription account associated with the user 180 is valid.

In addition to forwarding the alarm event data to the central monitoring station 125, the gateway server 120 may transmit the alarm event data to the user's smartphone 12 for presentation to the user 180 via the application 11 of the smartphone 12. In some embodiments, the gateway server 120 may push other data along with the alarm event data, such as advertisements for upgraded services, complementary services, special offers, or promotions to the smartphone 12.

Referring back to operation 502, if the gateway server 120 determines that the user 180 is subscribed to an 'on-demand' service, then, in operation 508, the gateway server 120 may determine if the user's subscription account is valid. In one example embodiment, the user 180 may have to provide a valid payment means (e.g., credit card, debit card, bank account information, or any other appropriate payment option) and an authorization to charge the payment means in the event of an alarm. At the time of an alarm or at the time of detection of an undesired event, the gateway server 120 may process the alarm event data, charge the payment means, and forward the alarm event data if the payment means was successfully charged for services incurred. In an alternative example embodiment, the user 180 can prepay for the alarm event or place the payment means on file with the gateway server 120 along with the authority to charge the payment means upfront, such as at a time of registration. Prepaying for the alarm event or having a payment means on file can reduce delay in payment processing at the time of the alarm.

In an example embodiment, the gateway server 120 may additionally determine if the alarm system is enrolled for a hybrid service. The additional determination may occur in parallel to or after the determination of that the alarm system is enrolled for an on-demand service. If the alarm system 100 is enrolled for the hybrid service, the subscription account may be considered to be invalid if the user has defaulted on payments or if a payment is overdue. If user has defaulted on payments or the payment is delinquent, then the alarm event data may not be processed and delivered to the central monitoring station 125 or the user 180 (e.g., smart phone 12 of user 180). In one example embodiment, the user 180 may have to agree up front that if they are notified of a delinquency or default in payment then the gateway server 120 may not deliver the alarm event data unless a valid payment means (e.g., credit card, debit card, bank account information, or any other payment option) and authority to charge for the outstanding delinquent or defaulted recurring amount and the per incident charge is on file with the gateway server 120 before the alarm event data is forwarded to the central monitoring station 125 and/or the smartphone 12. Once the subscription account is examined for validity, the gateway server 120 may determine that a payment account listed in a billing information associated with the subscription account of the user 180 has sufficient funds to cover a service fee associated with processing and/or reporting the alarm event data. The service fee may be determined based on the determination whether the alarm system is enrolled for the on-demand service or the hybrid service.

In either case, if the gateway server 120 determines that either the subscription account is not valid or the payment account does not have sufficient funds, then, in operation 510, the gateway server 120 may transmit a message to the user's smartphone 12 informing the user 180 that user's subscription account is invalid and/or the payment account of the user 180 does not have sufficient funds. Further, the gateway server 120 may inform the user 180 that the user has to address the issue associated with the user's subscription and/or payment account before the gateway server 120 processes the alarm event data any further. For example, if the subscription or payment account of the user 180 is not valid, the gateway server 120 may inform the user 180 that an undesirable event has occurred, but no additional details regarding the event, such as type of event, time of event, etc., may be provided to the user 180 without addressing the validity of the user's account. Further, the gateway server 120 may not report the event to the central monitoring station 125 if the user's subscription account is invalid and/or payment account does not have sufficient funds. In one example embodiment, the gateway server 120 may inform the user 180 by communicating with the user's smartphone 12 or any other computing device associated with the user 180, such as an email or alert to user's desktop computer, PDA, tablet, etc.

In one example embodiment, after informing the user 180 about the invalid account or insufficient funds, the gateway server 120 may provide an option for the user 180 to address the respective issues regarding the user's subscription and/or payment account. For example, if the user's payment account does not have sufficient funds, the gateway server 120 may provide an option for the user 180 to call an customer service operator associated with the gateway server 120 to make a payment over the phone, or prompt the user 180 to provide details of another payment account that may have sufficient funds. In another example embodiment, after informing the user 180 about the invalid account or insufficient funds, the event reporting process may terminate or may be put on hold till the issues associated with the user's account is sufficiently addressed.

However, if the user's subscription account is valid and the payment account has sufficient funds, then, in operation 512, the gateway server 120 may offer the user 180 a reduced one-time service fee (herein 'one-time service fee') with a condition that the user 180 registers for a service, such as a conventional service or hybrid service as described above, where the user has to pay a recurring monthly fee. The one-time service fee provided with the offer may be lower than the typical service fee associated with the on-demand service. For example, the typical service fee for the on-demand service may be $30 per event and the one-time service fee may be $10 provided the user 180 registers for a service where user 180 has to pay a monthly recurring fee of $15.

The gateway server 120 may transmit the offer to the user's smartphone 12 or any other computing device preferred by the user 180 for presentation to the user 180. In one example embodiment, the application 11 of the smartphone 12 may prompt the user 180 to accept or reject the offer for the one-time service fee. Rejecting the offer may indicate that the user 180 chooses to continue with the on-demand service plan where the user a service fee each time an event is detected and no monthly fee.

The prompt may trigger a selection by the user to accept or reject the offer and the selection may be forwarded to the gateway server 120. Upon receiving the selection, in operation 514, the gateway server 120 may determine if the user 180 has accepted or rejected the offer for the one-time service fee. If the user 180 has rejected the offer for the one-time service fee, then, in operation 516, the gateway server 120 may record the typical service fee associated with the on-demand service and the alarm event data in the database 121 for generating an invoice for the service incurred by the user 180.

In operation 518 and 520, the invoice may be generated and sent to the user 180. One or ordinary skill can understand and appreciate that operations 518 and 520 may be omitted in some embodiments, or may be performed after reporting the alarm event data to the central monitoring station 125 without departing from a broader scope of this disclosure.

Once the alarm event data and the service fee for processing the alarm event data is recorded in the database 121, in operation 508, the gateway server 120 may forward the alarm event data to the central monitoring station 125 where an agent 140 may dispatch appropriate emergency services to the monitored premise 105 where the undesirable event has been detected. In some embodiments, the agent 140 at the central monitoring station 125 may be instructed to report the undesirable event to other users that are listed on the user's subscription account. For example, the central monitoring station 125 may be instructed to inform other family members of the user 180.

Referring back to operation 514, if the gateway server 120 determines that the user has accepted the one-time service fee offer, then, the gateway server 120 may further determine the service plan to which the user desires to change. In addition, the gateway server 120 may record the reduced one-time service fee and the alarm event data to generate an invoice for the user 180. Upon determining the service plan chosen by the user 180, in operation 526, the gateway server 120 may update the subscription account of the user 180 to reflect the new service plan for which the user 180 has registered. Fee associated with any future detection and reporting of events may be based on the parameters associated with the updated service plan for which the user 180 has registered. Once the reduced one-time service fee and the alarm event data has been recorded, in operation 528, the event reporting process proceeds to operation 506 where the gateway server 120 forwards the alarm event data to the central monitoring station 125.

Now referring back to operation 504, if the gateway server 120 determines that user 180 is neither subscribed to the on-demand service nor the conventional service, then, in operation 530, the gateway server 120 may search the database 121 to determine if database 121 includes any information regarding the user's subscription account or payment account. Further, the gateway server 120 may determine if a contact information associated with the user 180 is available. If a contact information is available and no subscribed or payment account information is available, then, in operation 532, the gateway server 120 may communicate with the user 180 informing the user regarding detection of an undesirable event and requesting the user for a payment account to which a service fee can be charged for processing and reporting the received alarm event data corresponding to the detected undesirable event. Once the user has provided the payment account data, then in operation 534, the gateway server 120 determines if the user has authorized the gateway server 120 to charge the payment account. If the user 180 has not authorized the gateway server 120 to charge the payment account, then, in operation 540, the gateway server 120 may communicate with the smartphone 12 to request the user to provide an authorization to charge the payment account.

Upon receiving the authorization, in operation 538, the event reporting process proceeds to operation 526 where the gateway server 120 offers the user a reduced one-time fee for processing and reporting the current alarm event data provided that the user 180 registers for a service where the user has to pay a monthly recurring fee for a predetermined number of event reports, typically unlimited based on the fee amount. Then, the event reporting process proceeds through operations 514-528 as described above, where, based on the user's selection of service, eventually the alarm event data is reported to central monitoring station 125 for dispatch of appropriate services to address the undesirable event at the monitored premise. In some embodiments, instead of the one-time service fee, the user may be requested to register for a service that requires the user to pay a monthly recurring fee, such as a conventional service or hybrid service.

In other words, if alarm system is enrolled for an on-demand service plan, then the gateway server 120 may provide offers to solicit a user to enroll the alarm system 110 for a conventional service or a hybrid service. In an example, a user may be offered a low one-time service fee of $5 instead of typical $30 for a detected event, provided the user signs up for a service that has monthly recurring fee of $15.

Figure 6A:
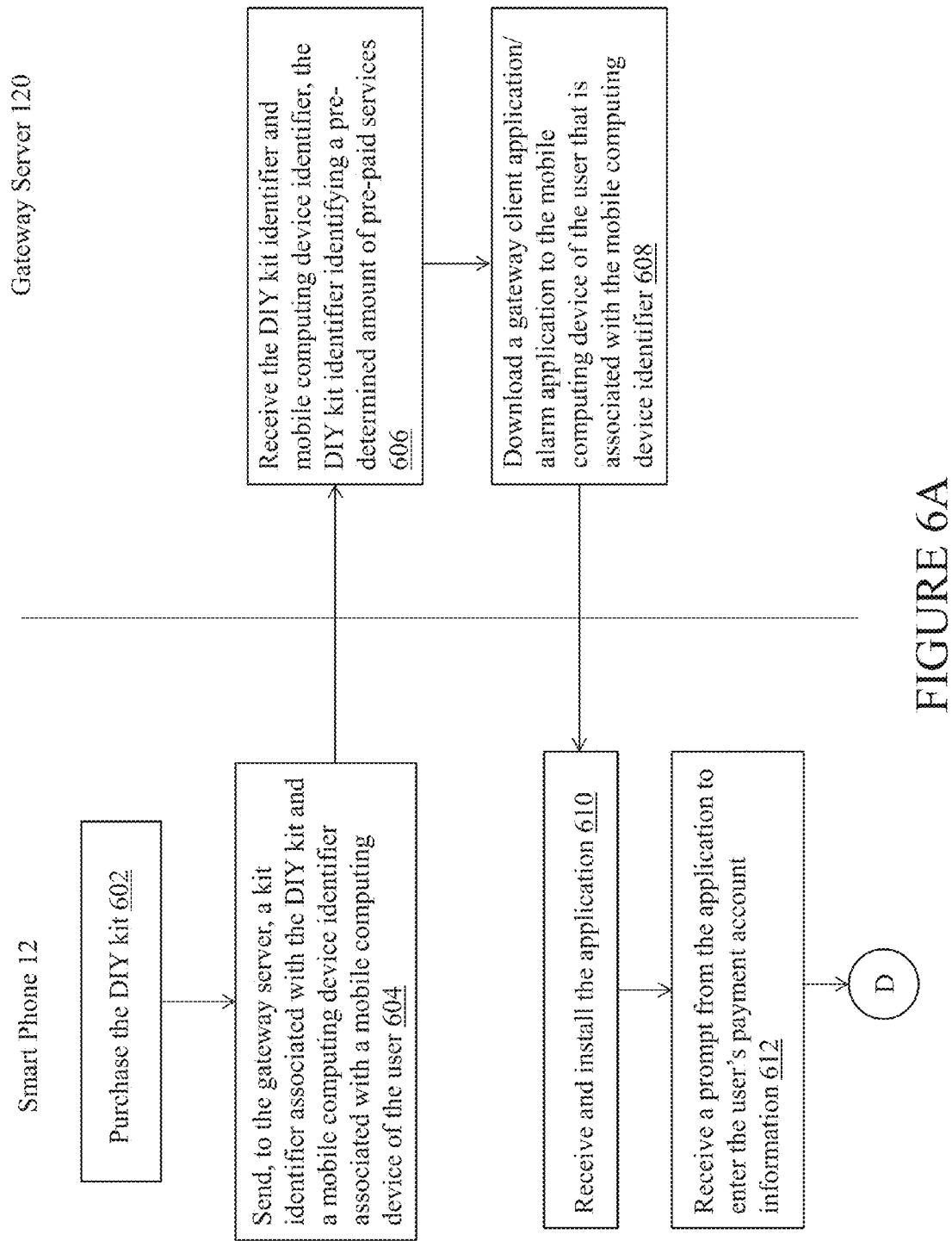
FIGS. 6A-6C (collectively 'FIG. 6')are flow charts that illustrate an overview of delivery of on-demand security solutions in a self-installable alarm system, according to certain exemplary embodiments of the present invention.
Figure 6B:
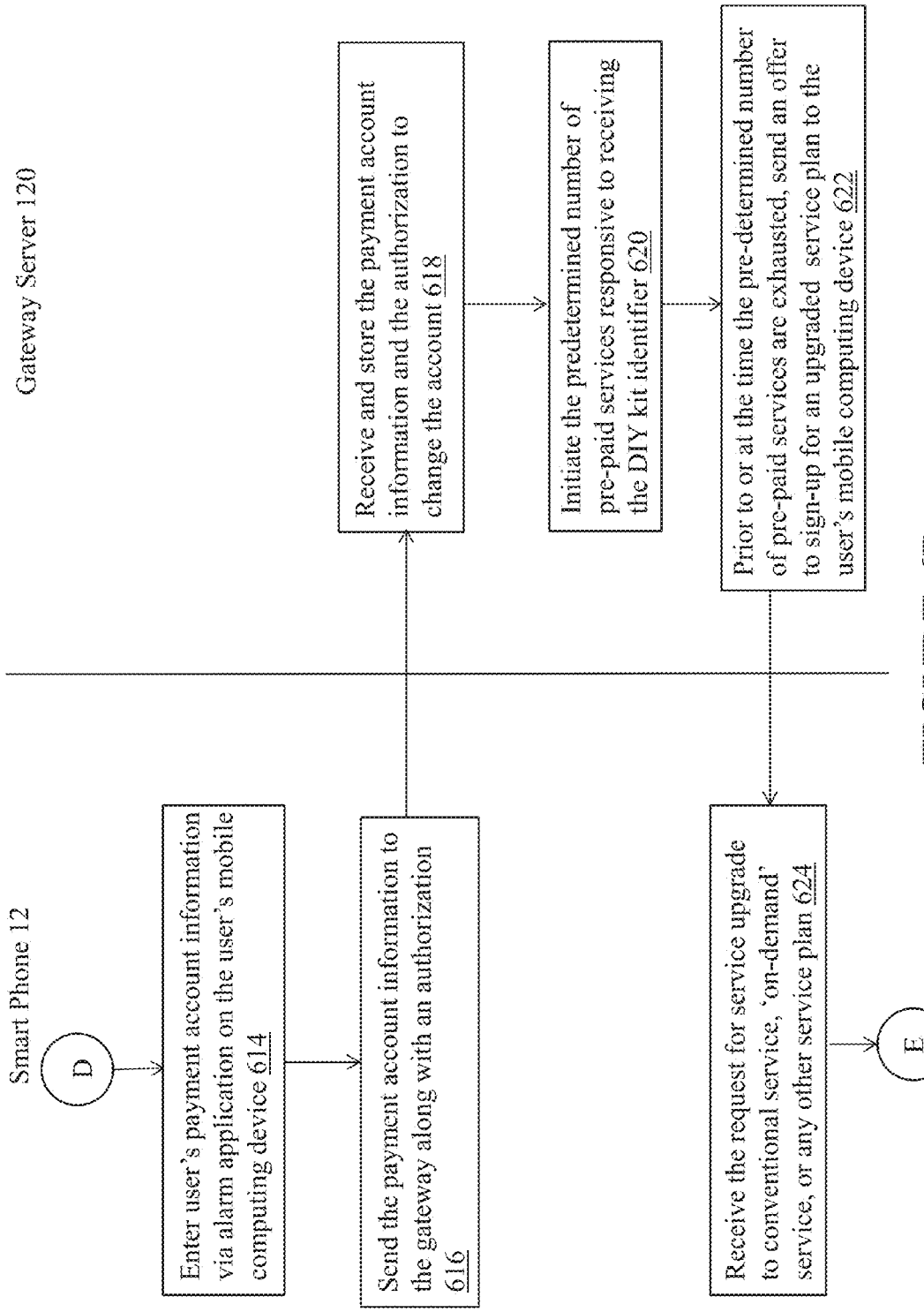
Figure 6C:
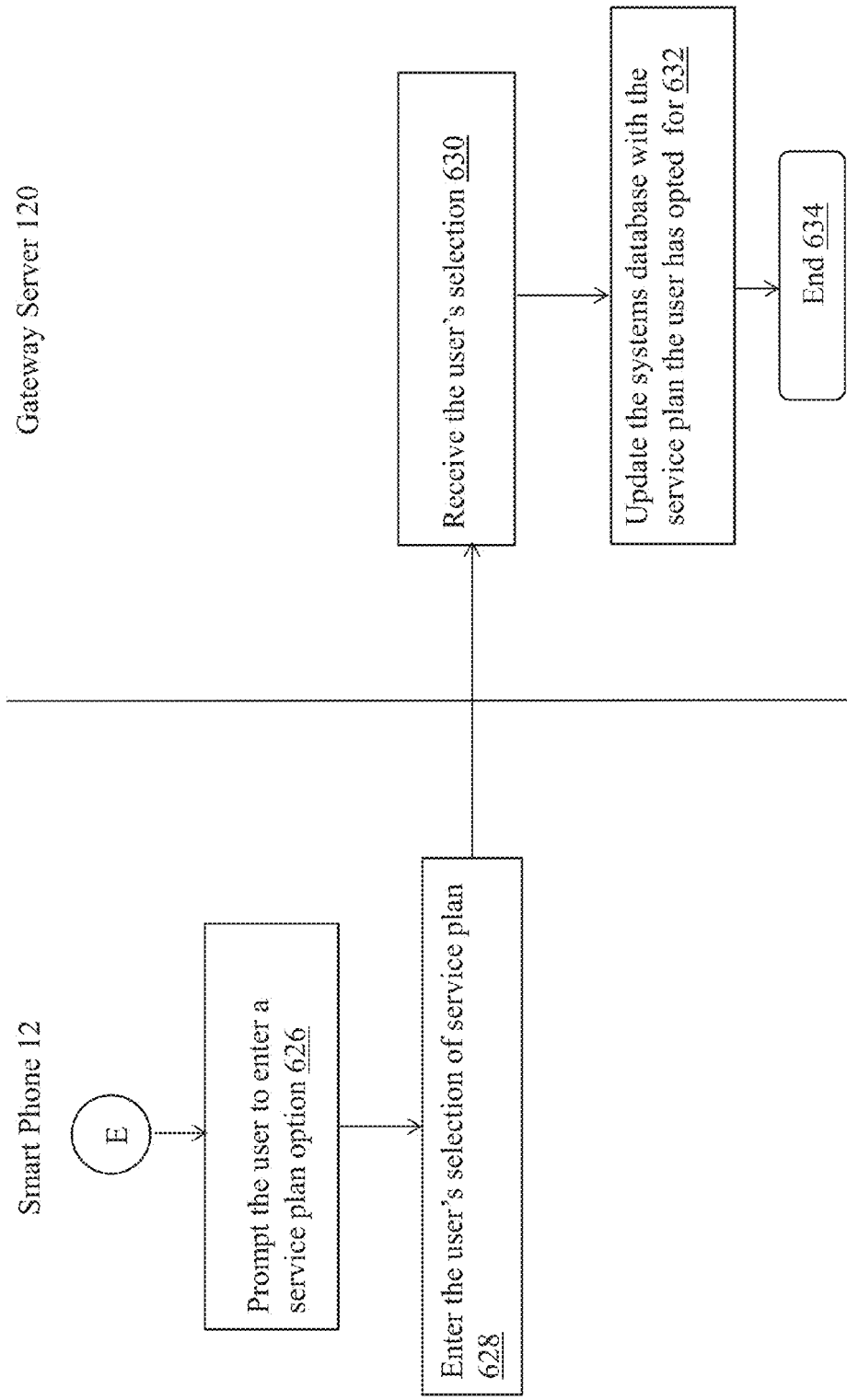

Now turning to FIG. 6, this figure is a flow chart that illustrates an overview of delivery of on-demand security solutions in a self-installable alarm system, according to certain exemplary embodiments of the present invention. In operation 602, a user 180 may purchase a portable, service escrowed alarm system which may be interchangeably referred to as a Do It Yourself (DIY) alarm system kit (herein 'DIY kit') or self-installable alarm system without departing from a broader scope of this disclosure. The DIY kit may have a finite number or a pre-determined number of services already associated with it when it is purchased, i.e., pre-paid service. For example, the DIY kit may already have 10 event detection and reporting services associated with it when it is purchased. The DIY kit may be sold through mass-market sales channels and the DIY kit may include an alarm system 100 that may be self-installable by the user 180. Additional information and operational details regarding the portable, service escrowed security event reporting system or DIY alarm kit is available in U.S. Pat. No. 8,265,605, entire contents of which is hereby incorporated herein by reference.

After the DIY kit is purchased, the user 180 may install the alarm system and may activate the alarm system. Upon activation, in operation 604, a kit identifier associated with the alarm system 100 of the DIY kit may be transmitted to the gateway server 120 either automatically or by manual operations by the user 180. The kit identifier may identify the pre-determined amount of pre-paid services associated with the alarm system 100. Further, in operation 604, the user 180 may transmit an identifier associated with a computing device (e.g., smartphone 12) of the user 180 to the gateway server 120. In one example, the installment instructions included with the DIY kit may provide a toll free number for the user 180 to call for providing the identifier associated with the user's smartphone 12. In another example, the user 180 may enter the identifier associated with the user's smartphone 12 into the alarm system 100 through the keypad available on the alarm panel 110. One of ordinary skill in the art can understand and appreciate that the above listed examples of providing or obtaining an identifier associated with the user's computing device is not exhaustive, and may include any number of appropriate additional methods may be utilized to obtain the identifier associated with the user's computing device.

In operation 606, the gateway server 120 may receive the kit identifier and the smartphone identifier of the user's smartphone 12. Upon receiving the identifier associated with the user's smartphone 12 (herein 'smartphone identifier'), in operation 608, the gateway server 120 may push an application 11 to the user's smartphone 12 identified by the smartphone identifier. Alternatively, the user 180 may be provided a hyperlink through which the user 180 can actively download the application 11 onto the user's smartphone 12. Further, in operation 610, the received application 11 is installed on the smartphone 12.

Once the application 11 is installed on the user's smartphone 12, in operation 612, the application 11 may prompt the user 180 to enter a payment account to which the user may be charged for services incurred by the user once the pre-determined amount of pre-paid services are exhausted. Further, the application 11 may prompt the user 180 for providing an authorization to charge the payment account for any appropriate services. Upon receiving the prompt, in operation 614, the user 180 may enter information associated with the user's payment account and provide an authorization through the smartphone 12. Further, in operation 616, the payment account information may be transmitted to the gateway server 120. In another embodiment, the user's smartphone 12 may have a mobile wallet application that includes payment account information which may be automatically transmitted to the gateway server 120 without the user's intervention provided the user 180 has pre-authorized such a transmission.

In either case, in operation 618, the gateway server 120 may receive the payment account information and the user's authorization providing the gateway server the authority to charge the payment account when necessary.

In operation 620, the gateway server 120 may activate the predetermined amount of pre-paid services for the alarm system 100 based on the received kit identifier. Further, in operation 622, the gateway server 120 may keep a count of the number of pre-paid services availed by the user 180. Prior to exhausting or when the pre-determined amount of pre-paid services has been exhausted, the gateway server 120 may offer the user 180 a list of different service plan options. In one example embodiment, the gateway server 120 may provide the user 180 an option for an on-demand service, hybrid service or a conventional service. In another example embodiment, the user 180 may be offered the one-time service fee for a detected event provided the user registers for a plan with monthly recurring monitoring fee as described above in association with FIGS. 4 and 5.

In operation 626, the user 180 may be prompted to select a plan from the list of plans provided to the user 180. In operation 628, the application 11 receives the user's selection of the service plan desired by the user 180, and the selection is transmitted to the gateway server 120 that receives the selection in operation 630. Upon receiving the selection, in operation 632, the gateway server 120 may update the subscription account information associated with the user 180 to reflect the service plan selected by the user 180. The process ends at operation 634.

Now turning to FIG. 7, this figure is a flow chart that illustrates an example process of offering security services based on events in surroundings of a premise, according to certain exemplary embodiments of the present invention. In operation 700, the gateway server 120 may receive an alarm event data corresponding to a detected undesirable event at a user's premise 105. Upon receiving the alarm event data, in operation 702, the gateway server 120 may process the alarm event data to determine a location of the monitored premise 105 where the undesirable event has been detected. Using the location of the monitored premise 105, in operation 704, the gateway server 120 may identify other premises, such as buildings, businesses, houses, etc., that are located within a threshold distance from the monitored premise 105. Further, the gateway server 120 may identify users associated with the other premises. In an example embodiment, the information regarding other premises and its associated users may be available in the database 121 or may be obtained from external public or private information databases.

Once the other premises and the users associated with the other premises have been determined, in operation 706, the gateway server 120 may transmit an advisory notifying an occurrence of the undesirable event at the monitored premise 105 to each of the users associated with the other premises, provided contact information for the users (herein 'other users') are available. In operation 708, in addition transmitting the alert, the gateway server 120 may provide an option to the other users to register for security services offered by the gateway server 120. If the other users are existing customers, then the gateway server 120 may provide options to upgrade current service, change current service, or add complementary services to the current service. In other words, the gateway server 120 may transmit a solicitation inviting each of the other users to subscribe to security services for their respective premise.

In an alternate embodiment, if an undesirable event has been detected at a premise that is within a threshold distance from the premise 105 of the user 180, then the gateway server 120 may transmit an advisory regarding the detected undesirable event in the user's neighborhood to the user 180. Further, the gateway server may solicit the user 180 to enroll for new services, to upgrade existing services, and/or add complementary services to the existing service.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structures and methods may be embodied using transistors, logic gates, and electrical circuits (e.g., application specific integrated (ASIC) circuitry and/or in Digital Signal Processor (DSP) circuitry).

The terms "invention," "the invention," "this invention," and "the present invention," as used herein, intend to refer broadly to all disclosed subject matter and teaching, and recitations containing these terms should not be misconstrued as limiting the subject matter taught herein or to limit the meaning or scope of the claims. From the description of the exemplary embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method comprising:
    receiving, by a gateway server, a first identifier associated with a mobile computing device and a second identifier associated with a Do It Yourself (DIY) alarm system kit that comprises an alarm system and that has a pre-determined number of pre-paid services;
    downloading, by the gateway server, an application to the mobile computing device;
    responsive to receiving the second identifier, activating, by the gateway server, the pre-determined number of pre-paid services;
    receiving, by the gateway server, alarm event data resulting from detection of an event by the alarm system at a premise monitored by the alarm system, the alarm event data identifying the alarm system;
    responsive to receiving the alarm event data, determining, by the gateway server, whether the pre-determined number of pre-paid services have been exhausted;
    responsive to a determination that the pre-determined number of pre-paid services have not been exhausted:
        debiting, by the gateway server, against the pre-determined number of pre-paid services; and
        forwarding, by the gateway server, the alarm event data to a central monitoring station or the mobile computing device; and
    sending, by the gateway server, an offer to the mobile computing device for a service subscription account associated with security services for the alarm system.

2. The method of claim 1, further comprising determining, by the gateway server, that a payment account associated with the service subscription account has sufficient funds to cover a payment of a processing service fee.

3. The method of claim 1, wherein the service subscription account comprises information designating the central monitoring station or the mobile computing device as a recipient for the alarm event data.

4. The method of claim 1, wherein a processing service fee for forwarding alarm event data to the central monitoring station or the mobile computing device under the service subscription account comprises a payment amount that exceeds a recurring fee for an alternative security service comprising monitoring the alarm system and forwarding each instance of alarm event data to the central monitoring station.

5. The method of claim 1, further comprising contacting, by the gateway server, a subscriber for the services subscription account to offer an option for reducing a processing service fee if the alarm system is enrolled in an alternative security service comprising monitoring the alarm system and forwarding each instance of alarm event data to the central monitoring station, the alternative security service associated with a recurring fee.

6. The method of claim 1, further comprising transmitting, by the gateway server, a record to a billing system that is configured to generate an invoice.

7. The method of claim 1, further comprising:
identifying, by the gateway server, individuals associated with other premises located in a geographical area within a threshold distance from the premise;
transmitting, by the gateway server, a message to the individuals, the message comprising an advisory that the event has occurred in the geographical area and a solicitation inviting each individual to subscribe to security services for their respective premise.

8. A system comprising:
a communication network; and
a gateway server coupled to the communication network and configured to:
receive a first identifier associated with a mobile computing device and a second identifier associated with a Do It Yourself (DIY) alarm system kit that comprises an alarm system and that has a pre-determined number of pre-paid services;
download to the mobile computing device an application associated with the DIY alarm system kit;
activate the pre-determined number of pre-paid services in response to receipt of the second identifier;
receive alarm event data resulting from detection of an event by the alarm system at a premise monitored by the alarm system, the alarm event data identifying the alarm system;
responsive to receiving the alarm event data, determine whether the pre-determined number of pre-paid services have been exhausted;
responsive to a determination that the pre-determined number of pre-paid services have not been exhausted:
debit against the pre-determined number of pre-paid services for service associated with receiving the alarm event data; and
forward the alarm event data to a central monitoring station and to the mobile computing device; and
send an offer to the mobile computing device for a service subscription account to extend security services for the alarm system beyond exhaustion of the pre-determined number of pre-paid services.

9. The system of claim 8, wherein the gateway server is further configured to determine that a payment account associated with the service subscription account has sufficient funds to cover a payment of a processing service fee.

10. The system of claim 8, wherein the service subscription account comprises information designating the central monitoring station or the mobile computing device as a recipient for the alarm event data.

11. The system of claim 8, wherein the gateway server is further configured to contact a subscriber for the services subscription account to offer an option for reducing a processing service fee if the alarm system is enrolled in an alternative security service comprising monitoring the alarm system and forwarding each instance of alarm event data to the central monitoring station, the alternative security service associated with a recurring fee.

12. The system of claim 8, wherein the gateway server is further configured to transmit a record to a billing system that is configured to generate an invoice.

13. The system of claim 8, wherein a processing service fee under the service subscription account comprises a payment amount that exceeds a recurring fee for an alternative security service comprising monitoring the alarm system and forwarding each instance of alarm event data to the central monitoring station.

14. The system of claim 8, wherein the gateway server is further configured to send the offer to the mobile computing device in response to exhaustion of the pre-determined number of pre-paid services.

15. The system of claim 8, wherein the gateway server comprises:
a dialer bank configured for establishing voice channels to the central monitoring station; and
a communication module configured for establishing cellular wireless communication paths with the alarm system and with the mobile computing device.

16. The system of claim 15, wherein the gateway server further comprises:
a pre-processor configured to perform overhead functions for outbound network communications; and
a post-processor configured to perform overhead functions for inbound network communications.

17. The system of claim 16, wherein the dialer bank is further configured for communicating the alarm event data to the central monitoring station using DTMF signaling over one of the voice channels.

18. The method of claim 1, wherein the gateway server sends the offer to the mobile computing device in response to exhaustion of the pre-determined number of pre-paid services.

19. The method of claim 1, wherein the gateway server comprises:
a dialer bank configured for establishing voice channels to the central monitoring station; and
a communication module configured for establishing cellular wireless communication paths with the alarm system and with the mobile computing device.

20. The method of claim 19, wherein the gateway server further comprises:
a pre-processor configured to perform overhead functions for outbound network communications; and
a post-processor configured to perform overhead functions for inbound network communications, and
wherein the dialer bank is further configured for communicating the alarm event data to the central monitoring station using DTMF signalling over one of the voice channels.

* * * * *